United States Patent
Hoshino

(10) Patent No.: US 10,179,535 B2
(45) Date of Patent: Jan. 15, 2019

(54) LIGHTING CONTROL DEVICE OF VEHICLE HEADLAMP AND VEHICLE HEADLAMP SYSTEM

(71) Applicant: Stanley Electric Co., Ltd., Tokyo (JP)

(72) Inventor: Shinya Hoshino, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 383 days.

(21) Appl. No.: 14/959,488

(22) Filed: Dec. 4, 2015

(65) Prior Publication Data

US 2016/0176335 A1    Jun. 23, 2016

(30) Foreign Application Priority Data

Dec. 19, 2014 (JP) .................................. 2014-257362

(51) Int. Cl.
*B60Q 1/14* (2006.01)
*F21Y 115/30* (2016.01)

(52) U.S. Cl.
CPC ........ *B60Q 1/143* (2013.01); *B60Q 2300/146* (2013.01); *B60Q 2300/45* (2013.01); *F21Y 2115/30* (2016.08)

(58) Field of Classification Search
CPC .... B60Q 1/143; B60Q 1/085; B60Q 2300/42; B60Q 2300/45; B60Q 1/08; B60Q 2300/114; B60Q 1/0023; B60Q 1/1423; B60Q 2300/146; B60Q 3/80; B60Q 1/525
USPC .................................................. 362/459–549
See application file for complete search history.

(56) References Cited

U.S. PATENT DOCUMENTS

| | | | | |
|---|---|---|---|---|
| 5,285,188 A | * | 2/1994 | Yoshida | B60R 21/013 340/436 |
| 2013/0329442 A1 | | 12/2013 | Kishimoto et al. | |
| 2015/0023032 A1 | * | 1/2015 | Kang | F21S 48/1145 362/466 |

(Continued)

FOREIGN PATENT DOCUMENTS

| | | |
|---|---|---|
| JP | 2005-238934 A | 9/2005 |
| JP | 2008-056136 A | 3/2008 |
| JP | 2012-121534 A | 6/2012 |

(Continued)

OTHER PUBLICATIONS

Japanese Office Action for the related Japanese Patent Application No. 2014-257362 dated Jul. 24, 2018.

*Primary Examiner* — William J Carter
(74) *Attorney, Agent, or Firm* — Kenealy Vaidya LLP

(57) ABSTRACT

In a vehicle headlamp that uses a light source having high output intensity, turn off the light source quickly when an abnormality occurs. A lighting control device of a vehicle headlamp includes a lighting control part that controls an on state of the vehicle headlamp, an obstacle detecting part for detecting an obstacle that exists in front of the vehicle, and a collision prediction processing part that, when the obstacle exists on the basis of detection results from the obstacle detecting part, predicts a possibility of collision between the obstacle and the vehicle on the basis of a distance between the obstacle and the vehicle and a speed of the vehicle and, when it is determined that the possibility of collision exists, instructs the lighting control part to relatively decrease an output light of the vehicle headlamp to below a normal intensity of the vehicle headlamp.

11 Claims, 4 Drawing Sheets

(56) References Cited

U.S. PATENT DOCUMENTS

2015/0124468 A1    5/2015   Reiners

FOREIGN PATENT DOCUMENTS

| | | |
|---|---|---|
| JP | 2013-526759 A | 6/2013 |
| JP | 2014-22069 A | 2/2014 |

* cited by examiner

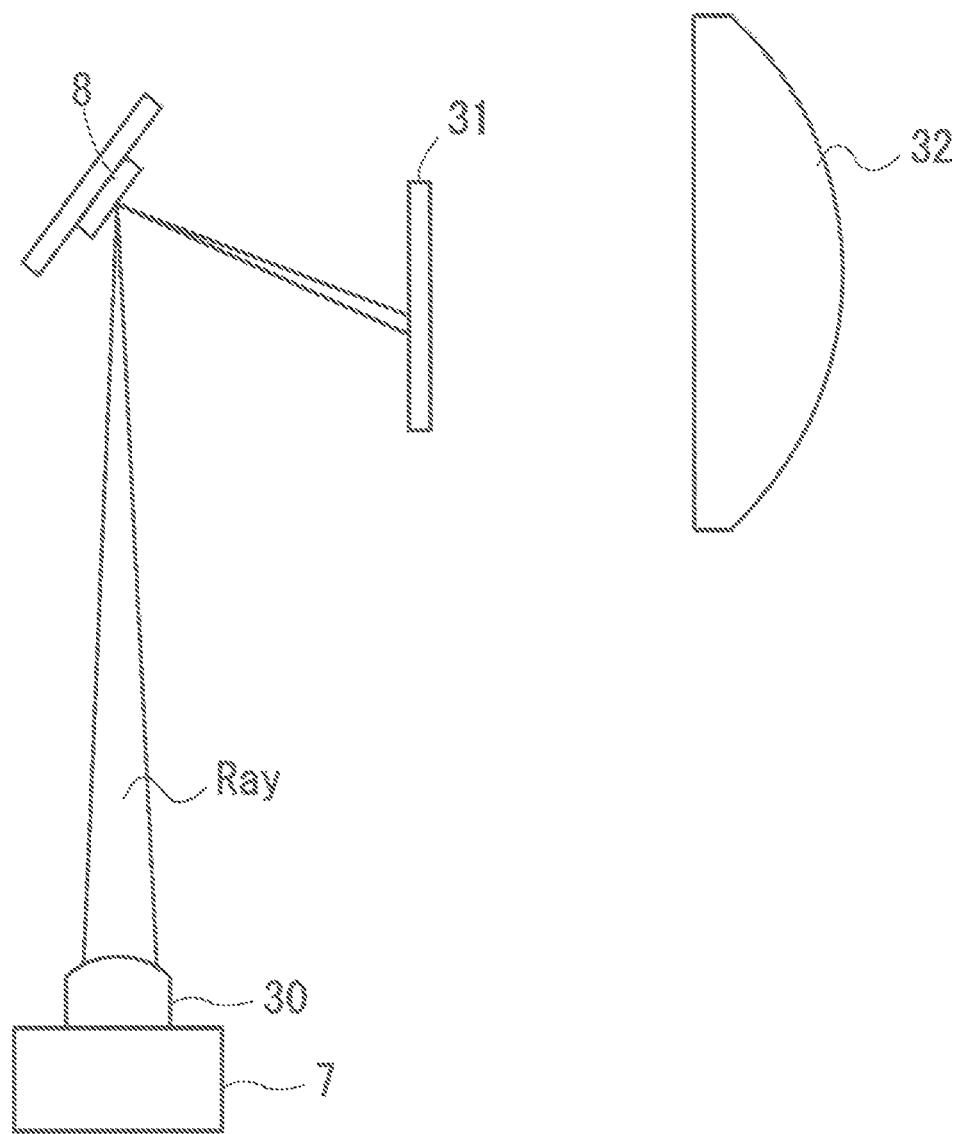

LIGHTING CONTROL DEVICE OF VEHICLE HEADLAMP AND VEHICLE HEADLAMP SYSTEM

BACKGROUND OF THE INVENTION

Field of the Invention

The present invention relates to a lighting control technology designed for a vehicle headlamp.

Description of the Background Art

Conventional examples of a vehicle headlamp include a headlamp that generates white light by causing light emitted from a laser diode to enter a fluorescent substance while scanning the light using a micro electro mechanical systems (MEMS) mirror or the like, and uses the light to illuminate an area in front of the vehicle. (For example, refer to Japanese Translation of PCT International Application Publication No. JP-T-2013-526759.) Further, a vehicle headlamp having a configuration in which a laser beam emitted from a semiconductor laser is made to directly enter a fluorescent substance without being scanned, causing the luminous body to emit light, is also known. (For example, refer to Japanese Unexamined Patent Application Publication No. 2014-022069.)

However, because the light of the laser diode used in the vehicle headlamp having such a configuration as described above has a relatively high output, a countermeasure is required to ensure that the light of the laser diode does not leak externally when the vehicle headlamp is damaged due to a vehicle collision or the like or when the fluorescent substance is otherwise damaged, detached, or the like. In this regard, it is also conceivable to continually detect an output state of the laser diode by a photodiode, and suspend operation of the laser diode if an abnormality occurs, for example.

However, because of problems in an operating speed of an electronic circuit, a relatively long time is required from abnormality detection by the photodiode to suspension of laser diode operation. Although dependent on the characteristics of the electronic circuit used and the like, the time required from abnormality detection to suspension of laser diode operation is in the order of several microseconds while the permissible exposure time of the laser diode is in the order of from several tens to several hundreds of nanoseconds, resulting in the possibility that the output light from the laser diode will leak externally as a result of damage to a housing of the vehicle headlamp.

Thus, technology that turns off the laser diode more quickly when an abnormality occurs is desired. Further, such a need is not limited to use of a laser diode as the light source, and can also similarly arise with use of a light source having relatively high light output intensity as well.

It is therefore one object of specific aspects according to the present invention to provide lighting control technology that, when an abnormality occurs in a vehicle headlamp that uses a light source having high output intensity, is capable of quickly turning off the light source.

SUMMARY OF THE INVENTION

A lighting control device of a vehicle headlamp of one aspect according to the present invention includes (a) a lighting control part that controls an on state of the vehicle headlamp, (b) an obstacle detecting part for detecting an obstacle that exists in front of the vehicle, and (c) a collision prediction processing part that, when the obstacle exists on the basis of detection results from the obstacle detecting part, predicts a possibility of collision between the obstacle and the vehicle on the basis of a distance between the obstacle and the vehicle and a speed of the vehicle and, when it is determined that the possibility of collision exists, instructs the lighting control part to relatively decrease an output light of the vehicle headlamp to below a normal intensity of the vehicle headlamp.

According to the configuration described above, the intensity of the output light of the vehicle headlamp is decreased when it is determined that the possibility of collision between the vehicle and the obstacle exists and thus, when the collision subsequently actually occurs, the intensity of the already decreased output light need only be further decreased to zero, making it possible to quickly turn off the vehicle headlamp. Thus, in a vehicle headlamp where a light source with a relatively high output light such as a laser diode is used, it is possible to turns off the light source quickly when an abnormality occurs.

In the lighting control device described above, the collision prediction processing part preferably determines that the possibility of collision exists when the distance between the obstacle and the vehicle is less than a predetermined value, for example. Additionally, in this case, the collision prediction processing part preferably determines that the possibility of collision exists when the speed of the vehicle is greater than a predetermined value.

Additionally, in the lighting control device described above, the collision prediction processing part preferably determines that the possibility of collision does not exist when it is determined that a collision avoidance behavior by the vehicle has been performed. In this case, the collision prediction processing part may determine that the collision avoidance behavior has been performed when a brake operation has been performed in the vehicle and/or when a steering wheel operation has been performed at a steering angle of a predetermined value or greater in the vehicle, for example.

As a result, it is possible to ensure that the intensity of the output light of the vehicle headlamp is not decreased more than necessary.

A vehicle headlamp system of one aspect according to the present invention is a vehicle headlamp system comprising the lighting control device described above, and a vehicle headlamp controlled by this lighting control device.

According to the configuration described above, in a vehicle headlamp where a light source with a relatively high output light such as a laser diode is used, it is possible to turns off the light source quickly when an abnormality occurs.

BRIEF DESCRIPTION OF THE DRAWINGS

FIG. 2 is a schematic diagram illustrating a configuration of an optical element of the vehicle headlamp.

DESCRIPTION OF THE PREFERRED EMBODIMENTS

The following describes embodiments of the present invention with reference to drawings.

Figure 1:
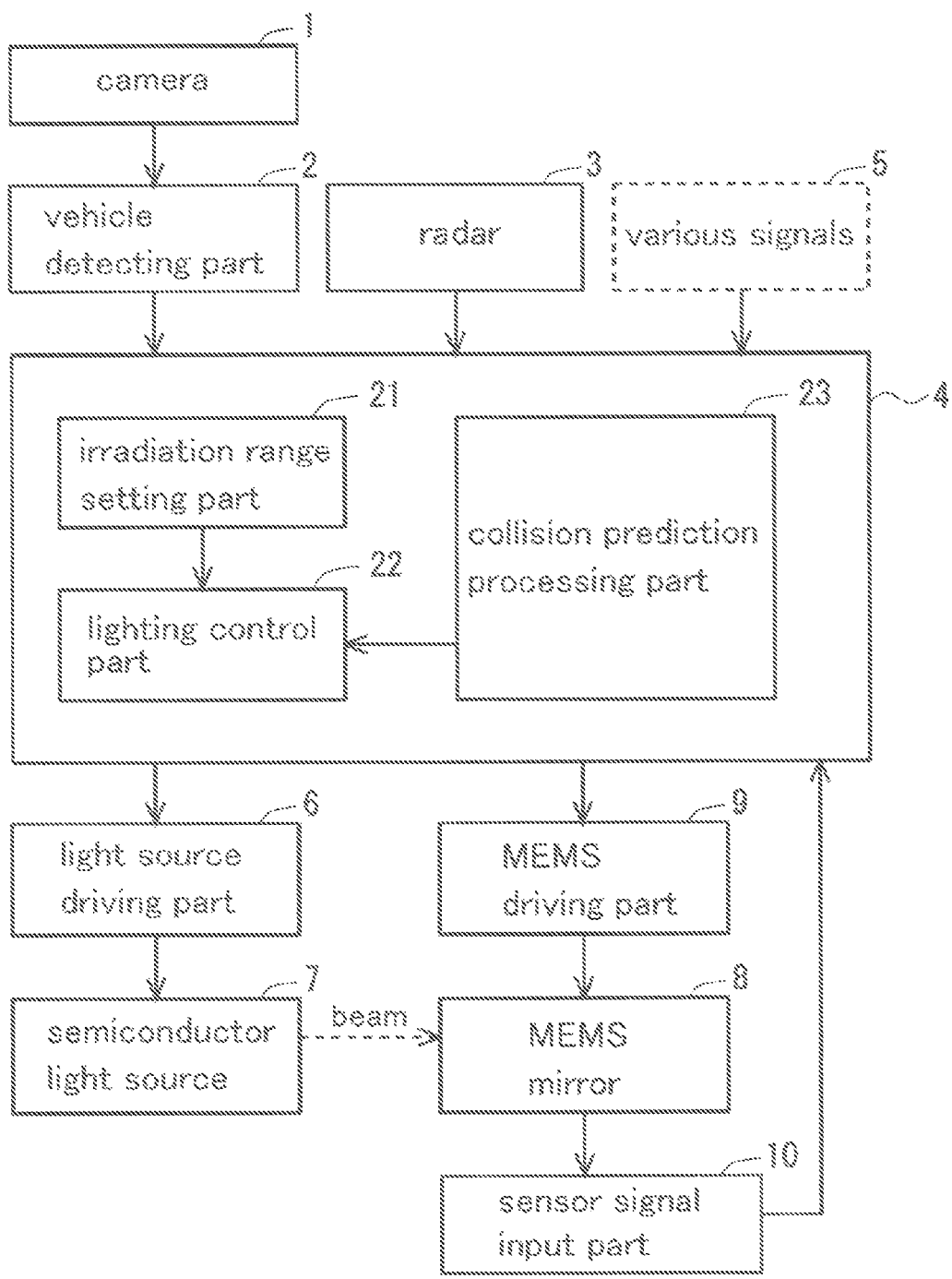
FIG. 1 is a block diagram showing the configuration of a vehicle headlamp system of one embodiment.

FIG. 1 is a block diagram showing the configuration of a vehicle headlamp system of one embodiment. The vehicle headlamp system of this embodiment is configured to include a camera 1, a vehicle detecting part 2, a radar 3, a control part 4, a light source driving part 6, a semiconductor light source 7, a MEMS mirror 8, a MEMS driving part 9, and a sensor signal input part 10. It should be noted that the "vehicle headlamp" is configured to include the light source driving part 6, the semiconductor light source 7, the MEMS driving part 9, the MEMS mirror 8, and the sensor signal input part 10. Further, the radar 3 corresponds to the "obstacle detecting part."

The camera 1 is provided in a predetermined position (such as on a dashboard, in an upper portion of a front windshield, or the like, for example) of the vehicle, and captures images of the space in front of the vehicle.

The vehicle detecting part 2 detects a position of an oncoming vehicle or a preceding vehicle that exists in front of the vehicle (hereinafter simply referred to as "forward vehicle") on the basis of an image of the space in front of the vehicle captured by the camera 1.

The radar 3 is for detecting an obstacle that exists in front of the vehicle, and is a millimeter wave radar, a laser radar, an infrared radar, or the like, for example. It should be noted that the obstacle may be detected by a stereo camera instead of the radar 3.

The control part 4 performs control for selectively irradiating light in accordance with a position of the forward vehicle detected by the vehicle detecting part 2. Various signals 5, such as a vehicle speed signal, a steering angle signal, an accelerator signal, a brake signal, and the like output from various sensors (not illustrated) included in the vehicle are input to this control part 4. This control part 4 has, for example, an irradiation range setting part 21, a lighting control part 22, and a collision prediction processing part 23 which serve as a function block configured by executing a predetermined operation program in a computer system that includes a CPU, a ROM, a RAM, and the like, for example.

Of an entire range that can be irradiated by the vehicle headlamp, the irradiation range setting part 21 sets a certain range that includes the position of the forward vehicle detected by the vehicle detecting part 2 as a shaded range, and the range aside from this as a light irradiation range.

The lighting control part 22 outputs a control signal for forming a light distribution pattern on the basis of the light irradiation range set by the irradiation range setting part 21 to the light source driving part 6 and the MEMS driving part 9. Further, the lighting control part 22 outputs a control signal to the light source driving part 6 so as to decrease a driving current of the semiconductor light source 7 when the collision prediction processing part 23 has determined that the possibility of collision between the vehicle and the obstacle exists.

The collision prediction processing part 23 predicts the possibility of collision between the obstacle that exists in front of the vehicle and the vehicle on the basis of a detection result from the radar 3 and the various signals 5, such as the vehicle speed signal and the like.

The light source driving part 6 supplies a driving signal to the semiconductor light source 7 on the basis of the control signal provided from the lighting control part 22.

The semiconductor light source 7 is a semiconductor light-emitting element such as a laser diode (LD) or the like that emits a laser beam of a blue spectral region (an emission wavelength of 450 nm, for example) as an excitation light, for example.

The MEMS (Micro Electro Mechanical Systems) mirror 8 scans a laser beam that enters from the semiconductor light source 7 in two-dimensional directions (a horizontal direction and a vertical direction) and causes the laser beam to enter a wavelength conversion member described later.

The MEMS driving part 9 drives the MEMS mirror 8 on the basis of a control signal provided from the lighting control part 22.

A sensor signal input part 10 detects an operation state of the MEMS mirror 8 and, if some abnormality exists, outputs a sensor signal indicating an abnormality.

FIG. 2 is a schematic diagram illustrating a configuration of an optical element of the vehicle headlamp. The laser beam Ray emitted from the semiconductor light source 7 is condensed by a condenser lens 30, and enters the MEMS mirror 8. The MEMS mirror 8 scans this laser beam two dimensionally, and causes the laser beam to enter a wavelength conversion member 31. The wavelength conversion member 31 converts at least a portion of the entered laser beam into a different wavelength. According to this embodiment, the wavelength conversion member 31 includes a fluorescent substance that is excited by the laser beam and produces yellow light. The colors of this yellow light and the laser beam (blue) that is transmitted through the wavelength conversion member 31 are mixed, thereby achieving a pseudo white light. The scan operation by the MEMS driving part 9 and the on/off driving of the semiconductor light source 7 by the light source driving part 6 are synchronized by the control of the lighting control part 22, thereby forming a light distribution pattern corresponding to the light irradiation range set by the irradiation range setting part 21. This light distribution pattern is projected in front of the vehicle by a projection lens 32, thereby achieving selective light irradiation in accordance with the position of the forward vehicle.

Figure 3A:
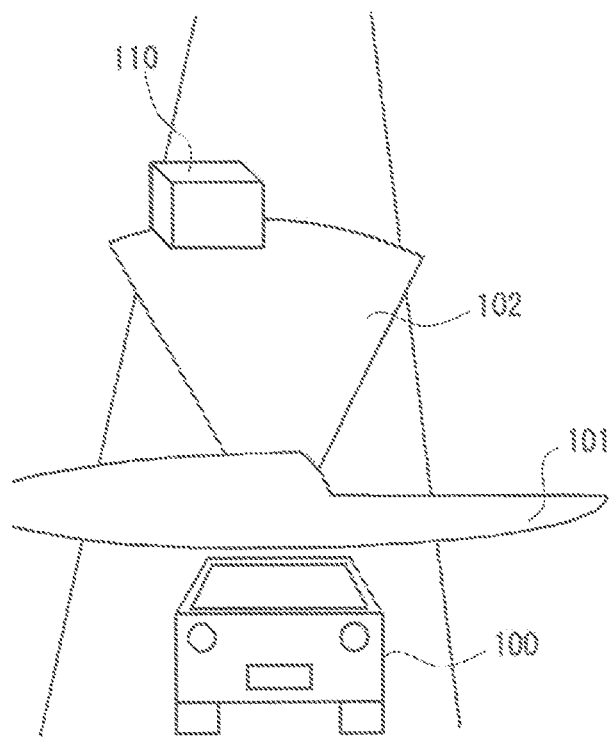
FIG. 3A and FIG. 3B are schematic diagrams that roughly explain an operation of the vehicle headlamp system with respect to an obstacle.
Figure 3B:
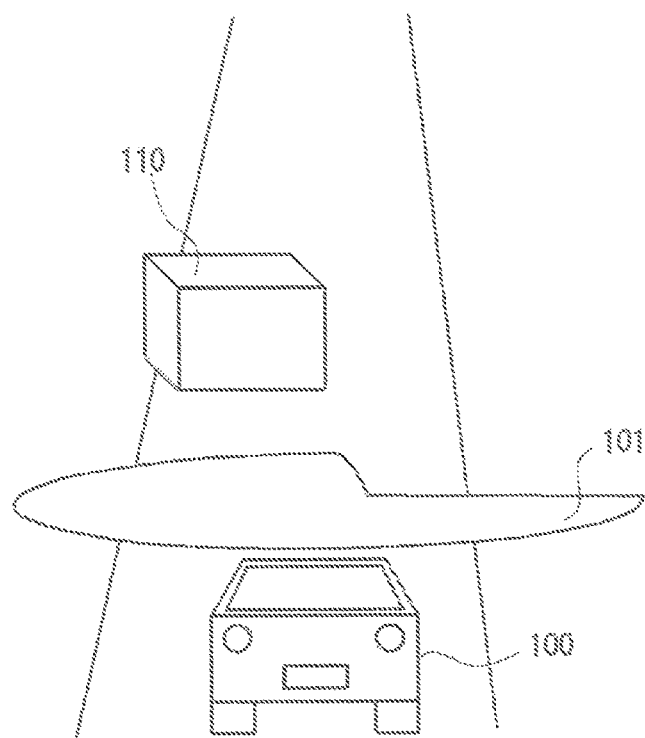

FIG. 3A and FIG. 3B are schematic diagrams that roughly explain an operation of the vehicle headlamp system with respect to an obstacle. As illustrated in FIG. 3A, when light is irradiated in a light distribution pattern 101 by the vehicle headlamp of a vehicle 100 during travel, some obstacle 110 is detected in a detection range 102 of the radar 3, and the existence of a possibility of collision between this obstacle 110 and the vehicle 100 is predicted. In this case, a size of a current (supply signal) supplied to the semiconductor light source 7 included in the vehicle headlamp of the vehicle 100 is decreased. As a result, even if the collision between the vehicle 100 and the obstacle 110 were to occur, causing vehicle headlamp damage, it is possible to quickly turn off the semiconductor light source 7. At this time, while a brightness of the light distribution pattern 101 decreases due to a decrease in the current supplied to the semiconductor light source 7, the distance between the vehicle 100 and the obstacle 110 becomes closer than when the obstacle 110 was detected (refer to FIG. 3A) as illustrated in FIG. 3B, and thus the driver is not hindered from seeing the obstacle 110.

Figure 4:
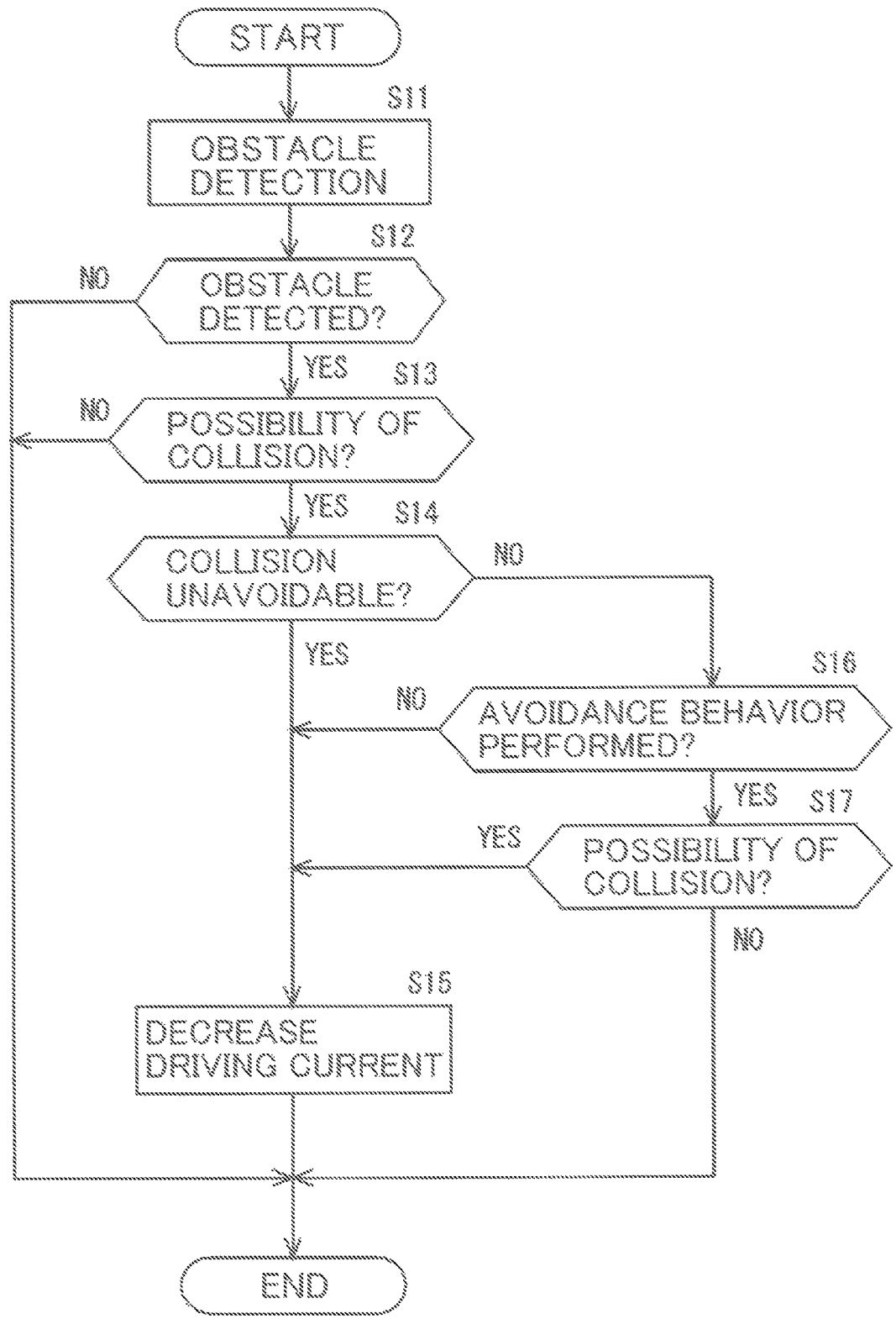
FIG. 4 is a flowchart showing the operation procedure of the vehicle headlamp system.

FIG. 4 is a flowchart showing the operation procedure of the vehicle headlamp system. The following will be described with reference to the flowchart.

When detection of an obstacle in front of the vehicle is executed by the radar 3 (step S11), the collision prediction processing part 23 determines whether or not an obstacle exists in front of the vehicle on the basis of the detection result by this radar 3 (step S12).

When an obstacle exists (step S12: Yes), the collision prediction processing part 23 determines whether or not the possibility of collision between the obstacle and the vehicle exists on the basis of the distance between the obstacle detected by the radar 3 and the vehicle (step S13). Specifically, when the distance between the obstacle and the vehicle is less than a predetermined value (tens of meters, for example), it is possible to determine that the possibility of collision exists.

When it has been determined that the possibility of collision with the obstacle exists (step S13: Yes), the collision prediction processing part 23 determines whether or not the collision between this obstacle 110 and the vehicle 100 is unavoidable (step S14). Specifically, when the speed of the vehicle is greater than a predetermined value (tens of kilometers per hour, for example), it is possible to determine that the collision is unavoidable. This is because, combined with the determination in step S13, it is possible to determine that the obstacle exists at a relatively close distance, and the stopping distance corresponding to the vehicle speed is greater than the distance between this obstacle and the vehicle.

When it has been determined that the collision is unavoidable (step S14: Yes), the collision prediction processing part 23 instructs the lighting control part 22 to decrease the driving current of the semiconductor light source 7, and the lighting control part 22 controls the light source driving part 6 so as to decrease the driving current in accordance with the instruction (step S15). Accordingly, the driving current supplied from the light source driving part 6 to the semiconductor light source 7 decreases, and the intensity of the laser beam emitted from the semiconductor light source 7 also decreases. It should be noted that the collision prediction processing part 23 may directly instruct the light source driving part 6 to decrease the supply current.

On the other hand, when it has been determined that the collision is not unavoidable in step S14 (step S14: No), the collision prediction processing part 23 determines whether or not behavior for avoiding the collision has been performed (step S16). Hence, when performance of a brake operation is detected on the basis of a brake signal from the vehicle and/or when performance of a steering wheel operation at a steering angle of a predetermined value or greater is detected on the basis of steering angle information, it is possible to determine that behavior for avoiding the collision has been performed.

When collision avoidance behavior has been performed (step S16: Yes), the collision prediction processing part 23 determines once again whether or not the possibility of collision between the obstacle 110 and the vehicle 100 exists on the basis of the detection result of the radar 3 (step S17).

When collision avoidance behavior by the vehicle has not been performed (step S16: No), or when the possibility of collision between the obstacle 110 and the vehicle 100 still exists (step S17: Yes), the flow proceeds to step S15 described above and control for decreasing the driving current supplied to the semiconductor light source 7 is performed.

On the other hand, when an obstacle does not exist (step S12: No), when the possibility of collision does not exist (step S13: No), and when the possibility of collision no longer exists (step S17: No), control for decreasing the driving current is not executed. It should be noted that, when the driving current had been decreased in such a control opportunity, the driving current is returned to the normal size. As a result, the intensity of the output light of the vehicle headlamp returns to the normal intensity.

According to such an embodiment as described above, the driving current supplied to the semiconductor light source is decreased when it is determined that the possibility of collision between the vehicle and the obstacle exists and thus, when the collision subsequently actually occurs, the driving current already decreased need only be further decreased to zero, making it possible to quickly turn off the semiconductor light source.

Note that this invention is not limited to the subject matter of the foregoing embodiments, and can be implemented by being variously modified within the scope of the gist of the present invention. For example, while the obstacle is detected by the radar in the embodiment described above, the obstacle may be detected by image recognition processing on the basis of an image captured by the camera. Further, while the above has described an example of application to a vehicle headlamp system that performs selective light irradiation, applicable targets of the present invention are not limited thereto, allowing application of the present invention to vehicle headlamp systems that use a light source having relatively high light intensity, such as a semiconductor light source, in general. Further, as means for scanning the laser beam, a digital mirror device (DMD), galvanometer mirror, or the like may be used instead of the MEMS mirror.

What is claimed is:

1. A lighting control device of a vehicle headlamp comprising:
    a lighting control part that controls an on state of the vehicle headlamp;
    an obstacle detecting part for detecting an obstacle that exists in front of the vehicle; and
    a collision prediction processing part that, when the obstacle exists on the basis of detection results from the obstacle detecting part, predicts a possibility of collision between the obstacle and the vehicle on the basis of a distance between the obstacle and the vehicle and a speed of the vehicle and, when it is determined that the possibility of collision exists, instructs the lighting control part to relatively decrease an output light of the vehicle headlamp to below a normal intensity of the vehicle headlamp, such that the lighting control part causes a decrease in intensity of light from the vehicle headlamp prior to collision to a non-zero state upon receipt of instructions from the collision prediction processing part when it is determined that the possibility of collision exists, wherein the lighting control part is configured to decrease intensity of light from the vehicle headlamp to zero after collision.

2. The lighting control device of a vehicle headlamp according to claim 1, wherein:
    the collision prediction processing part determines that the possibility of collision exists when the distance between the obstacle and the vehicle is less than a predetermined value.

3. The lighting control device of a vehicle headlamp according to claim 2, wherein:
    the collision prediction processing part determines that the possibility of collision exists when the speed of the vehicle is greater than a predetermined value.

4. The lighting control device of a vehicle headlamp according to claim 3, wherein:
    the collision prediction processing part determines that the possibility of collision does not exist when it is determined that a collision avoidance behavior by the vehicle has been performed.

5. The lighting control device of a vehicle headlamp according to claim 4, wherein:
    the collision prediction processing part determines that the collision avoidance behavior has been performed when a brake operation has been performed in the vehicle and/or when a steering wheel operation has been performed at a steering angle of a predetermined value or greater in the vehicle.

6. The lighting control device of a vehicle headlamp according to claim 2, wherein:
the collision prediction processing part determines that the possibility of collision does not exist when it is determined that a collision avoidance behavior by the vehicle has been performed.

7. The lighting control device of a vehicle headlamp according to claim 6, wherein:
the collision prediction processing part determines that the collision avoidance behavior has been performed when a brake operation has been performed in the vehicle and/or when a steering wheel operation has been performed at a steering angle of a predetermined value or greater in the vehicle.

8. A vehicle headlamp system comprising:
the lighting control device of a vehicle headlamp according to claim 2; and
a vehicle headlamp controlled by this lighting control device.

9. The lighting control device of a vehicle headlamp according to claim 1, wherein:
the collision prediction processing part determines that the possibility of collision does not exist when it is determined that a collision avoidance behavior by the vehicle has been performed.

10. The lighting control device of a vehicle headlamp according to claim 9, wherein:
the collision prediction processing part determines that the collision avoidance behavior has been performed when a brake operation has been performed in the vehicle and/or when a steering wheel operation has been performed at a steering angle of a predetermined value or greater in the vehicle.

11. A vehicle headlamp system comprising:
the lighting control device of a vehicle headlamp according to claim 1; and
a vehicle headlamp controlled by this lighting control device.

* * * * *